United States Patent
Doyle (10) Patent No.: US 9,363,983 B2
(45) Date of Patent: Jun. 14, 2016

(54) SYSTEM AND METHOD FOR MEASURING RELATIVE LEG POSITIONS OF AN UNGULATE

(76) Inventor: John Conan Doyle, Queensland (AU)

( * ) Notice: Subject to any disclaimer, the term of this patent is extended or adjusted under 35 U.S.C. 154(b) by 360 days.

(21) Appl. No.: 13/824,745

(22) PCT Filed: Sep. 29, 2011

(86) PCT No.: PCT/AU2011/001248
§ 371 (c)(1),
(2), (4) Date: Mar. 18, 2013

(87) PCT Pub. No.: WO2012/040782
PCT Pub. Date: Apr. 5, 2012

(65) Prior Publication Data
US 2013/0179088 A1 Jul. 11, 2013

(30) Foreign Application Priority Data
Sep. 29, 2010 (AU) ................................ 2010904382

(51) Int. Cl.
*A01K 1/00* (2006.01)
*A01K 29/00* (2006.01)
(52) U.S. Cl.
CPC ............... *A01K 29/005* (2013.01); *A01K 29/00* (2013.01)
(58) Field of Classification Search
CPC ..... A01K 5/02; A01K 11/006; A01K 1/0023; A01K 1/0017; A01K 11/004; A01K 15/028; A01K 1/0011; G01G 17/08
USPC .............. 119/518, 841, 842, 51.02, 511, 522; 382/110; 73/602; 452/157, 198
See application file for complete search history.

(56) References Cited

U.S. PATENT DOCUMENTS

| | | | |
|---|---|---|---|
| 2,510,703 A | * | 6/1950 | Linton .......................... 119/733 |
| 4,280,448 A | | 7/1981 | Ostermann |
| 4,288,856 A | | 9/1981 | Liseth |

(Continued)

FOREIGN PATENT DOCUMENTS

| | | |
|---|---|---|
| AU | 744213 | 1/2000 |
| CA | 2133156 A1 | 3/1996 |

(Continued)

OTHER PUBLICATIONS

Swanepoel, F.J.C. et al., "The Influence of Shoulder Height and Body Length on Performance of Simmentaler Bulls," *South African Journal of Animal Science*, 1985, vol. 16, p. 31-35.

(Continued)

*Primary Examiner* — David Parsley
*Assistant Examiner* — Assres H Woldemaryam
(74) *Attorney, Agent, or Firm* — Saliwanchik, Lloyd & Eisenschenk (57) ABSTRACT

A system (20) for measuring relative front (12, 13) and hind leg (16, 17) positions of a standing ungulate, the system including a sensing area within which an ungulate to be measured stands and which comprises a plurality of discrete linear sensor regions (30) spaced a known distance apart within the sensing area, each sensing region having a sensor operatively associated therewith, which sensor is responsive to the presence of the lower part of a leg within a sensing region and; a processor for receiving data from each sensor, identifying those sensor regions within which a lower part of a leg is present and based upon the distance between the identified sensor regions, determining the relative front and hind leg positions.

25 Claims, 8 Drawing Sheets

(56) References Cited

U.S. PATENT DOCUMENTS

| | | | |
|---|---|---|---|
| 4,617,876 A | 10/1986 | Hayes | |
| 4,702,200 A * | 10/1987 | Simington | 119/734 |
| 4,733,971 A | 3/1988 | Pratt | |
| 4,745,472 A | 5/1988 | Hayes | |
| 4,785,817 A | 11/1988 | Stouffer | |
| 4,815,042 A | 3/1989 | Pratt | |
| 4,889,433 A | 12/1989 | Pratt | |
| 4,939,574 A | 7/1990 | Petersen et al. | |
| 5,315,505 A | 5/1994 | Pratt et al. | |
| 5,331,923 A * | 7/1994 | Mollhagen | 119/734 |
| 5,339,815 A | 8/1994 | Liu et al. | |
| 5,340,211 A | 8/1994 | Pratt | |
| 5,483,441 A | 1/1996 | Scofield | |
| 5,576,949 A | 11/1996 | Scofield et al. | |
| 5,644,643 A | 7/1997 | Scofield et al. | |
| 5,673,647 A | 10/1997 | Pratt | |
| 6,425,351 B1 * | 7/2002 | Mollhagen | 119/733 |
| 6,516,746 B2 | 2/2003 | Pratt | |
| 6,591,221 B1 * | 7/2003 | Doyle | 702/159 |
| 6,639,352 B2 | 10/2003 | Eom | |
| 6,974,373 B2 | 12/2005 | Kriesel | |
| 7,128,024 B2 * | 10/2006 | Doyle, II | 119/518 |
| 2003/0024481 A1 * | 2/2003 | Kalscheur et al. | 119/174 |
| 2003/0150396 A1 * | 8/2003 | White | 119/512 |
| 2005/0011466 A1 * | 1/2005 | Doyle | 119/518 |
| 2011/0036305 A1 * | 2/2011 | Gipson | 119/843 |

FOREIGN PATENT DOCUMENTS

| | | |
|---|---|---|
| CA | 2216309 A1 | 11/1997 |
| CA | 2335845 | 12/2000 |
| JP | 10-206549 | 8/1998 |
| WO | WO 99/67631 | 12/1999 |
| WO | WO 2005/009118 A2 | 2/2005 |

OTHER PUBLICATIONS

International Search Report and Written Opinion concerning PCT/US2004/022835, filed Jul. 15, 2004, applicant John C. Doyle.

* cited by examiner

SYSTEM AND METHOD FOR MEASURING RELATIVE LEG POSITIONS OF AN UNGULATE

CROSS REFERENCE TO A RELATED APPLICATION

This application is a National Stage Application of International Application Number PCT/AU2011/001248, filed Sep. 29, 2011; which claims priority to Australian Application No. 2010904382, filed Sep. 29, 2010; which are incorporated herein by reference in their entirety.

The present invention relates to a system and method for measuring the relative leg position of an ungulate. In particular, the present invention is directed towards a system and method for determining relative leg positions of cattle and using those relative positions to calculate skeletal body length of the animal. These measurements may be either manually or automatically obtained dependent on operator preference.

BACKGROUND OF THE INVENTION

The present invention will be described with particular reference to the measurement of cattle. However, it will be appreciated that the system and method of the present invention is applicable to measuring other types of ungulates and no limitation is intended thereby. Examples of animals that may be measured according to the method and system of the present invention include cattle, goats, sheep, giraffes, American Bison, European bison, yaks, water buffalo, deer, camels, alpacas, llamas, wildebeest, antelope, pronghorn, pigs and horses.

It is often desirable to obtain an estimate of an animal's physical size. For commercial meat producing animals, size may be used to monitor growth rate and predict a finishing weight. For non-meat producing animals, it may also be desirable to monitor size and/or growth rate to assist in animal management. In particular, it is also desirable to measure the skeletal growth rate of dairy heifers. Dairy heifers are measured along with weighing to insure heifers do not deposit fat in the udder. When fat is deposited in the udder, their lifetime milk production is lowered dramatically. Traditionally, weight has been used as an approximate measure of size as the measuring equipment is relatively simple.

Meat producing animals are often slaughtered at a target weight. However, animal weight provides little or no information as to the quantity of muscle protein, and total body fat, carcass quality or grade of the meat which is assessed according to the quantity of intramuscular fat or marbling. Expression of intra-muscular fat traits requires that the animal has the genetic capacity for deposition, has not encountered major nutrient intake limitations during its growth period and deposits a critical percentage of total body fat. It is known that intramuscular fat deposition is enhanced as carcass fat increases to a certain level. Thus, an animal that is slaughtered at an optimal body fat content may be more valuable than an animal having lower total body fat and less marbling for a specific market. However, animal weight alone provides little or no information of muscle protein, total body fat or carcass quality.

A factor that is often used to describe the growth potential of cattle is frame score. If an animal's age is known, the relationship between age and the measured hip height can be converted to a frame score. Generally, an animal maintains a constant frame score throughout its life if allowed to consume adequate quantities of nutrients for potential growth. Animals with a higher frame score will have a greater mature body weight than an animal with a smaller frame score when animals are at similar percentage of total body fat.

Knowledge of an animal's frame score together with weight can provide a much more reliable indicator of growth and eventual carcass weight, tissue composition or quality. Still further, measuring both size and weight can provide information regarding the relative amounts of muscle protein and fat deposition. For example, observing animals of similar weight, a large frame score animal will have less total body fat or more muscle protein where a smaller frame score animal has higher total body fat and less muscle protein. Thus, having knowledge of frame score and weight can permit an estimate of total body fat and muscle protein. It will be appreciated that such information is particularly useful for assessing and/or predicting a meat producing animals' finishing weight for slaughter.

Hip height is traditionally measured with a calibrated pole with a slide. In use the pole is placed adjacent the animal and the slide is moved along such that it rests on the animals' back. Making manual measurements of an animal in this manner is time consuming, and in some cases potentially dangerous for the operator. In order to address this problem, an automated method of measuring the pelvic height of an animal using ultrasound has been developed by the present inventor and described in WO99/67631.

In practise however, the age of an animal is not always known which means that the frame score/weight relationship cannot be used to predict body composition. This may be addressed by making measurements at time intervals to determine an animal's growth rate. A fast skeletal and muscle growing animal will deposit little fat, whereas a slow skeletal and muscle growing animal will deposit greater quantities of fat provided access to similar nutritional inputs. Further information regarding the potential of an animal may be obtained by making measurements in addition to hip height. In particular, animal width and length can provide valuable information.

The present inventor has also developed a system and method for measuring skeletal length that utilizes the relationship between the position of an individual bovine legs and skeletal length. Generally, the mid-point between the front legs is substantially perpendicular to the immediate region within or posterior to the point of shoulders of the animal. The mid-point between the hind legs of an animal is substantially perpendicular to the hip joints of the pelvic region of the animal. The system uses a light source and an optical device to obtain a silhouette image of the legs. The image is then processed to determine the position of the animal's legs and obtain an estimate of the skeletal length of the animal. Despite the improvements of this system over prior art methods the present inventor has now developed an alternative method and system for measuring an animal.

SUMMARY OF THE INVENTION

According to a first broad form of the invention, there is provided a system for measuring relative front and hind leg positions of a standing ungulate, the system including;
  a sensing area within which an ungulate to be measured stands and which comprises a plurality of discrete linear sensor regions spaced a known distance apart within the sensing area, each sensing region having a sensor operatively associated therewith, which sensor is responsive to the presence of the lower part of a leg within a sensing region and;
  a processor for receiving data from each sensor, identifying those sensor regions within which a lower part of a leg is present and based upon the distance between the identified sensor regions, determining the relative front and hind leg positions The system has a sensing area having a number of discrete linear sensor regions spaced a known distance apart. The linear sensor regions are typically aligned such that they are parallel and substantially at right angles to a line extending along the animals spine. They may also be arranged substantially parallel with a line extending along the animal's spine, although this is less preferred, as a front leg may interfere with detection of a rear leg and vice versa.

The processor can identify which sensor regions have a lower part of a leg within that sensing region. Suitably, the sensing regions have an identifier such as a numerical identifier that may increase in number from the anterior to the posterior of the animal. As the sensing regions are a known distance apart, each identified sensing region may also be allocated a distance from a reference point.

The sensors as used in the system of the present invention may be of any suitable type that can detect the presence of the lower part of an ungulates leg within a linear sensor region. In one form of the invention, the system comprises an array of sensor beam emitters of known spacings. The spacing between the emitters is typically less than the average diameter of the lower part of the ungulates legs. For cattle, the spacing is typically between about 30 mm to about 80 mm, preferably about 50 mm.

The sensor beam may be any suitable beam including but not limited to infra-red, visible light, ultrasound or laser. Where the beam is an ultrasound beam, a transducer having a narrow beam emission, suitably with a width of about 20 mm to 30 mm, typically about 25 mm.

The sensor array may operate on any suitable sensor mode that is suitable for detecting an object that interrupts a sensor beam. Typically, the array operates in a retro-reflective mode in which receivers and emitters are located together and the system includes either an array of spaced reflectors or a continuous reflector located opposite the emitters. In this way, an object that interrupts the light travelling between the emitter and the reflector may be detected. An alternative mode of operation is of the through beam mode having an array of equally spaced receivers located opposite the emitters. In this way, objects that interrupt a particular beam or beams may be detected. Alternatively, the receiver may detect a beam reflected from an object interrupting the beam. This method of detecting cattle length allows automatic detection of animal through the processor for manual or automatic capture of data.

The system includes a processor for determining the distance between interrupted beams. As the location of the interrupted beams corresponds to an animal's leg, the distance between interrupted beams may be used to provide information as to the relative positions of the animal's legs. As the spacing between each beam is known, determining the distance between interrupted beams is a relatively straightforward calculation.

In an alternative embodiment, the system may include a grate with a plurality of spaced apart bars displaceable vertically in response to the weight of an ungulates foot. The bars may be operatively connected to a sensor that can detect when a bar has been displaced. Suitably the bars also have a return mechanism for returning the bars to the normal position after weight has been removed.

The floor grate may be any suitable arrangement and the bars may be round rectangular, or square in cross section. The bars are typically made from steel or other strong and durable material. Suitably each bar is fitted with an individual position sensor placed on one or each side that is disrupted when weight is placed on the bar. The position sensor then sends a signal to a controller or processor. Suitably, the bars are mounted within channels that allow vertical movement with minimal horizontal movement. The bars may also have a return mechanism to return the bars to the original position when weight has been removed. Suitable mechanisms include a resilient material such as rubber, air or a fluid bag. Alternatively, the bars may be biased towards the return position by springs.

According to a further broad form of the invention there is provided a method for measuring relative front and hind leg positions of a standing ungulate, the method including;
providing a sensing area within which an ungulate to be measured stands and which comprises a plurality of discrete linear sensor regions spaced a known distance apart that in use extend towards a side of an ungulate within the sensing region, each sensing area having a sensor responsive to the presence of the lower part of the ungulate's legs within the sensing region and;
determining the distance between those sensing areas within which a leg has been detected based upon the known spacings and obtaining relative front and hind leg positions from said distance.

A preferred method includes providing an array of sensor beam emitters of known spacings for emitting sensor beams towards the lower part of the ungulate's legs such that at least some sensor beams are interrupted by the legs and;
determining the distance between the interrupted sensor beams based upon the known spacings and obtaining relative front and hind leg positions from said distance.

The relative front and hind leg positions may be used to provide an estimation of an animal's skeletal length. This approximation is based upon the fact that a healthy ungulate's normal stance is such that the animal's body weight is suspended from front and rear legs through respective pivotal joints. Leg position allows comfortable support of the animal body through centering gravity or equal distribution of weight. When an animal is standing with such equal distribution, the midpoint between the front legs is substantially perpendicular to the immediate region within or posterior to the point of shoulders of the animal and the mid-point between the hind legs is substantially parallel to the hip joints of the pelvic region of the animal. By measuring the relative positions of the legs and calculating the mid-point between front and hind legs, an estimate of skeletal body length between the point of shoulder and hip joints may be made.

It will be appreciated then, that in order for a relatively accurate estimation of body length to be made, the animal should be standing in a natural position when the measurements are made. Unnatural leg positions and bending of the neck so as to distort shoulder, neck or head position can result in incorrect measurements. Such unnatural leg position can occur if an animal is under stress or standing on a slippery or uneven surface. A distorted stance may also occur when the animal is restrained with conventional handling equipment such as crushes, cradles or squeeze chutes that apply pressure to hold the neck, shoulders and sides.

In a particularly preferred system of the invention, the animal is confined without physical restraint. Typically, the animal is confined in a confinement unit having opposed side walls and entry and exit doors. The sensor emitter array is mounted along a lower portion of one side wall. Sensor beam receivers, if employing a through-seam mode of sensor operation are suitably mounted on the opposed wall. If using a retro-reflective mode of operation a prismatic reflector or reflector tape is typically mounted on the opposed wall. Typically, the side walls are solid such that the animal cannot see out the sides of the unit. This may reduce the animal's stress.

A particularly preferred animal confinement unit has side walls that converge towards the base of the unit. This allows more space around the animal's head whilst limiting excess leg movement. Head area space serves to reduce stress and generate animal confidence which facilitates the animal settling in a natural stance.

The actual size of the confinement unit may vary depending upon the variation in animal sizes and any animal production systems used in association with the system. The unit is typically dimensioned such that the animal has adequate space for forward and backward movement to become comfortable and find a natural standing leg position but also have an appropriate width for longitudinal positioning of the animal for reliable measurements to be able to be taken.

Preferred internal dimensions of a confinement unit for use with cattle ranges in length from about 2.4 m to about 3.0 m with a base width of between about 0.500 to about 0.600 m, a top width of between about 0.75 m to about 0.85 m and a height of between about 1.8 m to about 2.0 m.

The confinement unit may also be placed in a perpendicular side unit or raceway to minimize animal sideways movement. The perpendicular walls may be stationary or collapsible to minimize distance to allow for calculation of pelvic width.

In order to accommodate smaller animals, the unit may further include inwardly facing bumpers to further reduce the internal width in the lower parts of the unit. The bumpers may be fixed or moveable between an extended and withdrawn position. When bumpers are present, the sensor beam emitter array is typically located below the bumpers.

The base of the unit is typically provided with a floor. The floor is preferably made of a material that provides for hoof friction and/or compression for traction such that the animal is confident in moving into the unit. Slippery and/or hard floors can cause an animal to balk or stand in an unnatural position. Floors are designed to allow ready drainage of released excrement.

Suitable types of flooring include rubber matting with or without textured surface. The textured surface may have longitudinal, transverse and/or crisscross patterns about 10 mm to about 40 mm in depth. This surface allows a level of hoof compression and friction for animal confidence and natural standing leg positioning. Rubber matting is superior for cattle movement and standing, and allows easy cleaning.

Cattle entering the confinement unit may fail to fully advance within range of sensor readings, placing pelvic or tail region into rear door. The confinement unit rear door can be fitted with an inside extension block (100-200 mm) on each edge of door to keep cattle within sensor range. Another method is fitting a rubber bumper onto rear entrance floor, preventing animal from placing hooves into rear door area.

It is also preferred that the unit has adequate illumination, as this may also assist with animal confidence. Still further, the unit may be designed to minimize noise, as noise may distress a confined animal.

According to a further form of the invention there is provided an ungulate confinement unit for confining an ungulate without physical contact, the unit having a base, opposing side walls diverging away from the base such that the head space area for a confined animal is wider than the lower leg space area.

The system may typically further include a device for measuring animal height and most preferably for measuring either or both animal height and width. Preferred types of devices employ the use of ultrasound as previously described by the present inventor in WO99/67631 and WO 2005/009118.

Measurement of animal length, height and width can provide an approximate, 3-dimensional geometric measurement of the skeletal size of the animal. The skeletal measurements are reflective of an individual's body tissue carrying capacity and growth potential. For cattle, other meat producing animals and dairy animals, this can be useful in animal management and in estimating animal growth rate. For meat producing animals a finishing weight within a desired fat/protein body ratio can also be estimated or calculated. An animal's skeletal length is generally a better indicator of bone growth and a better predictor of mature body weight than shoulder or hip height because animal skeletal growth is greater longitudinally rather than vertically.

The system of the present invention may also further include a device for measuring the animal's weight. The confinement unit may be associated with a weight scale device placed under the unit or above suspending the unit. Alternatively a weight scale device may be located either before the entry point or after the exit point of the confinement unit. This weight data is automatically downloaded or manually entered into the processor. Alternatively, the animal may be weighed remotely and the information regarding weight automatically or manually be entered into the processor for respective animal.

The system typically further includes a reader for electronically identifying an electronic animal identifier. Electronic animal identification devices include ear tags, implants, collar or ruminal boluses that may be used to identify individual ungulate without physical contact.

Electronic identification systems using passive transponders are nationally mandated in Australia, New Zealand and Canada for their National Livestock Identification Systems. The Half Duplex (HDX) is a TI-RFID™ 134.2 kHz technology that has been adopted by the National Livestock Identification System in Australia, New Zealand, Canada and ISO accredited. The other technology is Full Duplex (FDX) which is a 134 kHz LF technology tag also used in the Canadian livestock identification scheme. These technologies vary in signal strength, requiring alignment of the transponder with an antenna for signal transmission.

The electronic reader used to obtain a signal from the passive transponder is suitably mounted prior to entry or within the confinement unit to allow reading the individual animal's identification signal to be read and sent to the processor. Some readers such as antennae are sensitive to metal structures which can interfere in reading of the electronic identification. Manufacturers recommend mounting antennae on plastic or wood surfaces.

A preferred location for mounting the antennae to a confinement box is on the periphery or outside of instrument devices located on front or rear panels constructed of plastic or wood side walls. An alternative location is on the front side panel that can be constructed of solid wood or plastic.

Electronic identification systems may also be 'live transponders' devices possessing an internal power source that constantly emits animal unique identification and history to a specialized reader. The advantages of these systems is that they can identify animals at much further distances and multiple animals or a group of animals can be identified at one time. Monitoring animal identification with this device will require modifying the reader to allow single animal identification within the confinement box.

The processor may be any suitable type of processor capable of carrying out the necessary analysis of data from the sensors array and where desired calculating an animal's length. The processor is suitably also capable of receiving and processing further data inputs from ultrasound transducers for height and/or width measurement, weight scale devices, and electronic animal identification devices and the like. Although a personal computer with suitable software may be employed as the processor, it is preferred that the processor may operate as a stand alone unit from a computer with the ability to transfer processed data via network, internet network for storage on central data base or directly onto a personal computer for data storage and manipulation.

In one form of the invention, the system is operated manually in which an operator initiates data capture when an animal is observed to be in a normal standing position. Such manual operation may conveniently be operated using a hand held remote controller. In cases where there is a high throughput of animals and the likelihood of human confusion and error, it is preferable that the processor includes a means of signalling to an operator that animal data has been captured or not captured. After an operator has received confirmation that data has been captured, the operator may release that animal and allow a different animal to enter the measurement area. This is typically controlled by entry and exit doors or gates.

Alternatively, the data may be automatically captured such that a human operator is not required to determine when an animal is standing for measurement. An automatic mode would typically include a means for determining when an animal is substantially standing still. Such a method requires identifying specific animal via an electronic identification system and may include taking a stream of readings from the sensors for a period of time until such time as the readings are substantially constant. In the embodiment which further includes a ultrasound transducer, a stream of ultrasound measurements may be used alternatively or in addition to the sensor measurements to determine when an animal is standing still enough for measurement. An automated system may remove the subjectivity associated with manual operation. An automated system may also include automatic control of animal entry and exit. For example, after data capture has been made, an exit gate may automatically be opened followed by opening an inlet gate to allow the next animal in to be measured.

In another form of the system and method of the invention, the animals may be drafted according to measurements and/or calculations obtained therefrom. For example, in the case of cattle depending upon their measured size, they may be directed towards different pens for different processing or dispatch to market.

The system and method of the present invention are typically employed in association with management of feedlot cattle. Typically, an animal is weighed and measured upon entry to the feedlot. After about 60 days they are measured and weighed again. The second measurement allows skeletal and muscle growth and level of fat deposition to be ascertained. Optionally further measurements may be taken at further time intervals to obtain more information relating to an animal's growth rate.

According to a further broad form of the present invention, there is provided a method for determining the growth rate of an ungulate, the method including determining a first skeletal body length and weight at a first time point, determining a second skeletal length and second weight at a second time point and comparing first and second lengths and weights;
wherein the skeletal body length is determined by;
providing a sensing area within which an ungulate to be measured stands and which comprises a plurality of discrete linear sensor regions spaced a known distance apart that in use extend towards a side of an ungulate within the sensing region, each sensing area having a sensor responsive to the presence of the lower part of the ungulate's legs within the sensing region and;
determining the distance between those sensing areas within which a leg has been detected based upon the known spacings and obtaining relative front and hind leg positions from said distance; and
determining the mid-point between the front legs and calculating skeletal body length from said mid-points.

Obtaining the weight of the ungulate at a first time point and obtaining a second skeletal body length and weight measurement at a predetermined second time point.

Obtaining animal body dimensions in conjunction with or without body weight assists in the prediction of live cattle growth and an estimate of final mature cattle size. Ultimately, these live animal dimensions can be used to predict carcass weight, various anatomical characteristics (e.g. size & weight of rump area, rib eye area, etc), anatomical structural soundness and carcass grade for various countries based on a carcass dissection system (e.g. USDA, Canada, Mexico, South Africa).

BRIEF DESCRIPTION OF THE FIGURES

By way of example only, preferred embodiments of the present invention will be described with reference to the following figures.

DETAILED DESCRIPTION OF THE FIGURES

Figure 1:
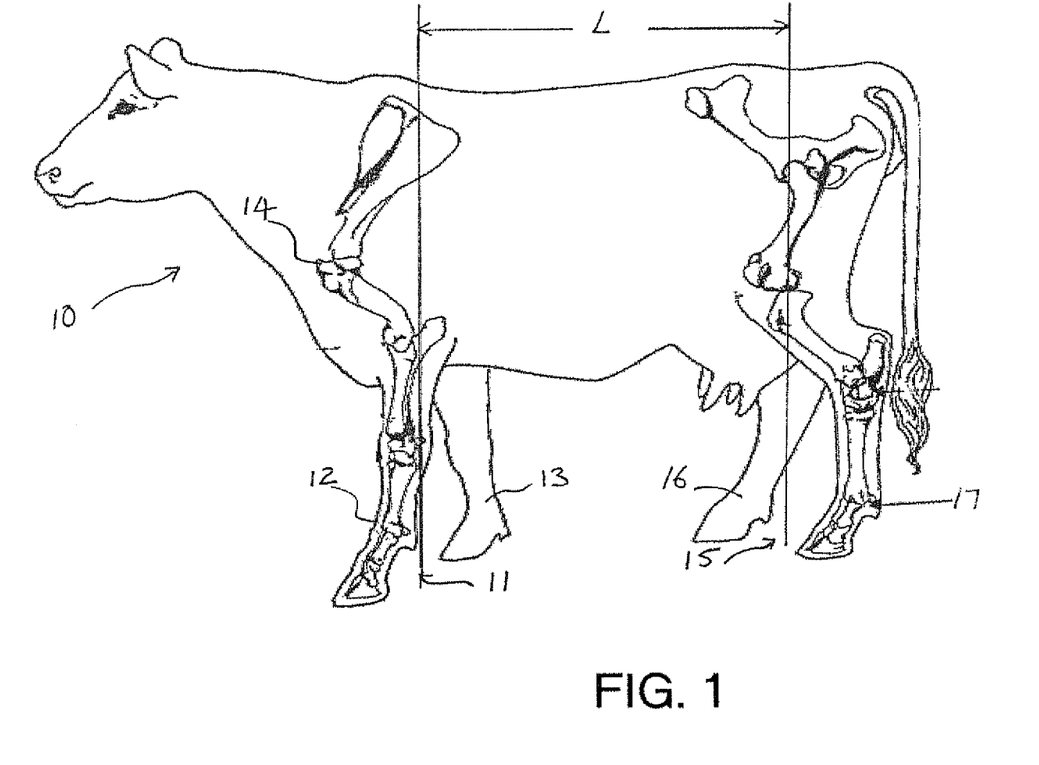
FIG. 1 is a schematic view of a cow.

FIG. 1 shows a schematic view of a cow 10, and the relationship between leg position and skeletal length. The midpoint 11 between the two front legs 12, 13 lies substantially behind the point of shoulders 14 of the animal. The midpoint 15 between the hind feet 16, 17 is substantially perpendicular to the hip joints on the pelvic region 18 of the animal. The distance L provides a good estimation of skeletal length.

Figure 2:
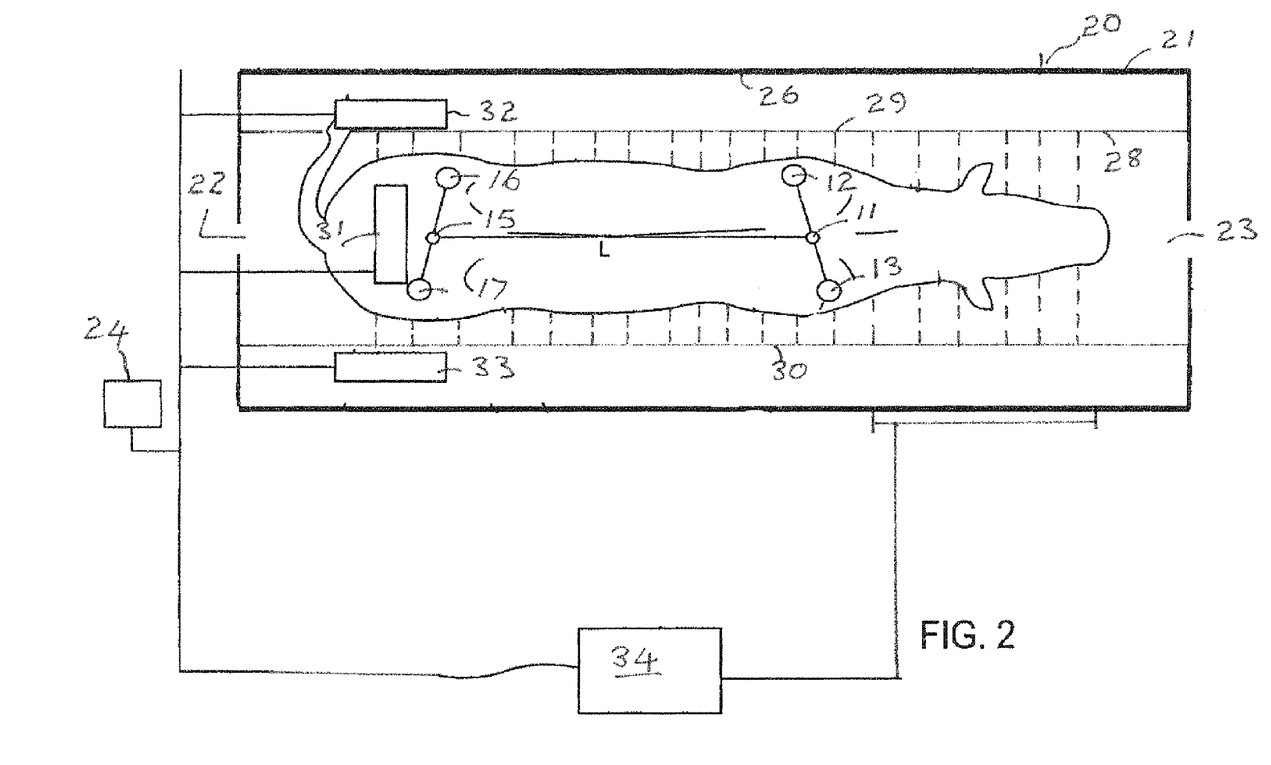
FIG. 2 is a schematic plan view of a preferred system of the present invention.

FIG. 2 is a plan view of the system 20 in use. The system 20 includes a confinement box 21 having entry 22 and exit 23 doors. Associated with the doors are electronic identification devices 24, 25 for electronically reading an electronic animal identification device and thus recording when a particular animal enters and leaves the box. The confinement box 21 has opposing side walls 26, 27 that are angled towards the floor. Bumpers 28 extend outwardly from each wall. An array 29 of sensor beams is located along one wall 26. The sensor beams operate using red light 624 nm. The opposing wall 27 has strip of reflective tape 30 for reflecting those sensor beams not blocked by the animal's legs.

The system 20 also includes ultrasound transducers 31, 32, 33 located above and on either side of the pelvic region. A processor 34 is provided for processing data from the transducers and receivers and for calculating animal dimensions as will be discussed below.

Figure 3:
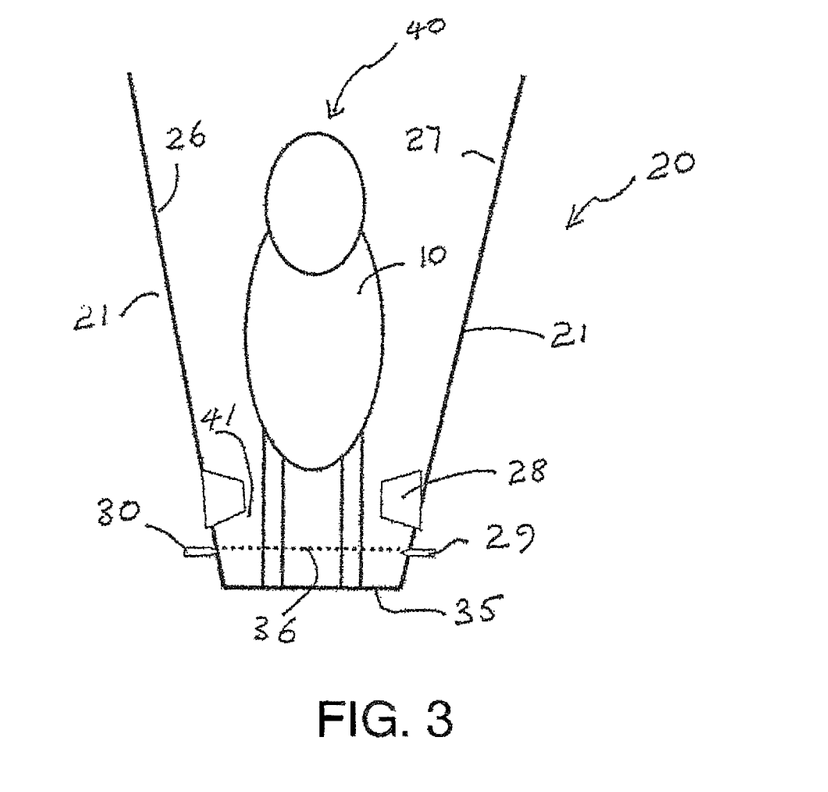
FIG. 3 is a schematic front view of the system illustrated in FIG. 2.

FIG. 3 is a schematic front view of the system 20 of FIG. 2 which shows the angle of inclination of side walls 26, 27 towards floor 35. It may be seen that the angle of inclination of the walls defines a wider head space area 40 than the lower leg space area 41. The wider head space area allows the animal to have sufficient head space to feel comfortable whilst limiting lateral leg movement.

Figure 4:
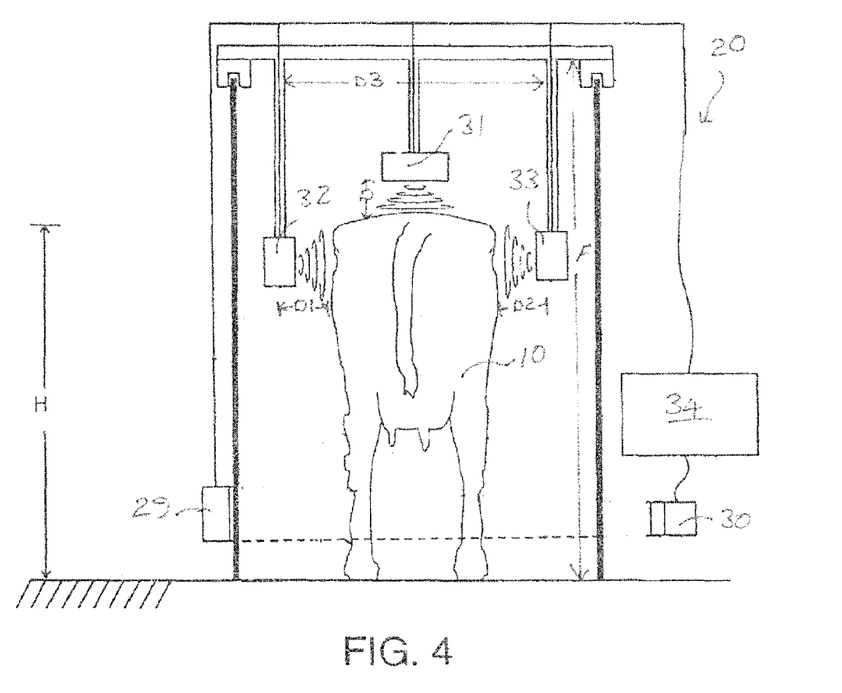
FIG. 4 is a schematic rear view of the system illustrated in FIG. 2.

FIG. 4 shows a rear view of the system 20 and illustrates the transducers 31, 32, 33 in use. Transducer 31 is located vertically above the pelvic region of the animal and allows the distance D between transducer and animal to be measured. As the distance F between the transducer and floor is known, the animal height H may be calculated according to H=F−D. The transducers are timed separately to send and receive signals to avoid signals crossing or creating signal interruption.

Transducers 32, 33 are located on opposing sides of the animal. Each transducer measures the distance D1, D2 between the transducer and the side of the pelvic region. As the distance D3 between the transducers is known, pelvic width W may be calculated according to W=D3−D1−D2.

The generated ultrasound signal has a diameter that covers a region of the animal's body. The processor can calculate the enable the shortest distance a reflected signal travels such that the highest or wider points may be measured. This means that the animal does not need to stand exactly vertically below transducer 31 or equidistant between transducers 32, 33. Absence or distorted signals are removed from the calculation.

Figure 5:
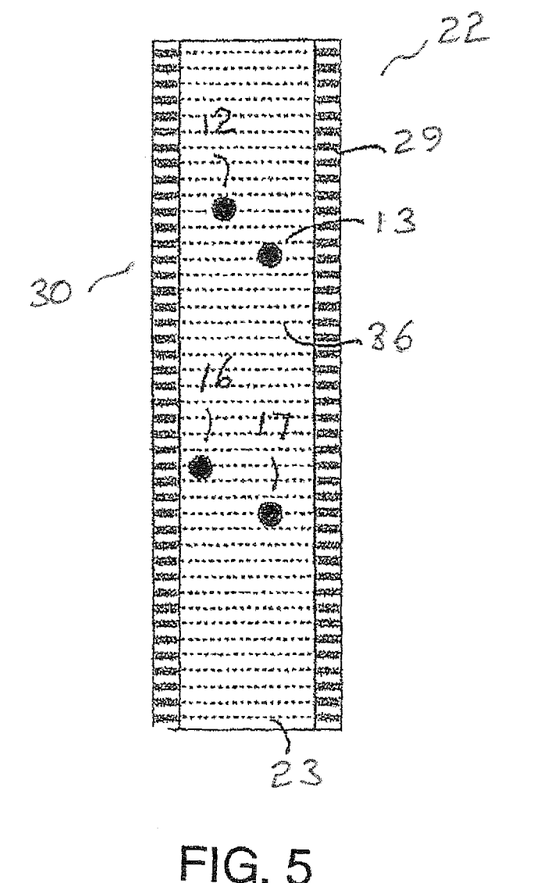
FIG. 5 is a schematic view showing the relationship between an animal's legs and sensor beams.

FIG. 5 schematically shows the relationship between front 12, 13 and hind leg 16, 17 positions and sensor beams 36. The sensor beam emitters in array 29 are located 50 mm apart. The sensor beams are numbered numerically from the front 22 to the rear 23 of the confinement unit. The front left leg 12 interrupts sensor beams 11 and 12; the right front leg or anterior leg interrupts beams 14, 15 the left hind leg or posterior leg interrupts beams 27, 28 and the right hind leg interrupts beams 30-31. This allows the calculations as shown in the following Table, in terms of distance from the front of the box.

| Position | Sensor | Distance |
|---|---|---|
| Anterior | 11 | 550 mm |
| Anterior | 12 | 600 mm |
| Anterior | 14 | 700 mm |
| Anterior | 15 | 750 mm |
| Posterior | 27 | 1350 mm |
| Posterior | 28 | 1400 mm |
| Posterior | 30 | 1500 mm |
| Posterior | 31 | 1550 mm |

This allows the following calculations to be made:
Anterior distance: ((750 mm−550 mm)×0.5)+550 mm=650 mm position of mid thoracic region of cattle.
Posterior distance: ((1550 mm−1350 mm)×0.5)+1350 mm=1450 mm position of mid pelvis.
The thoracic to pelvic length is calculated as 1450 mm−650 mm=800 mm.

Figure 6:
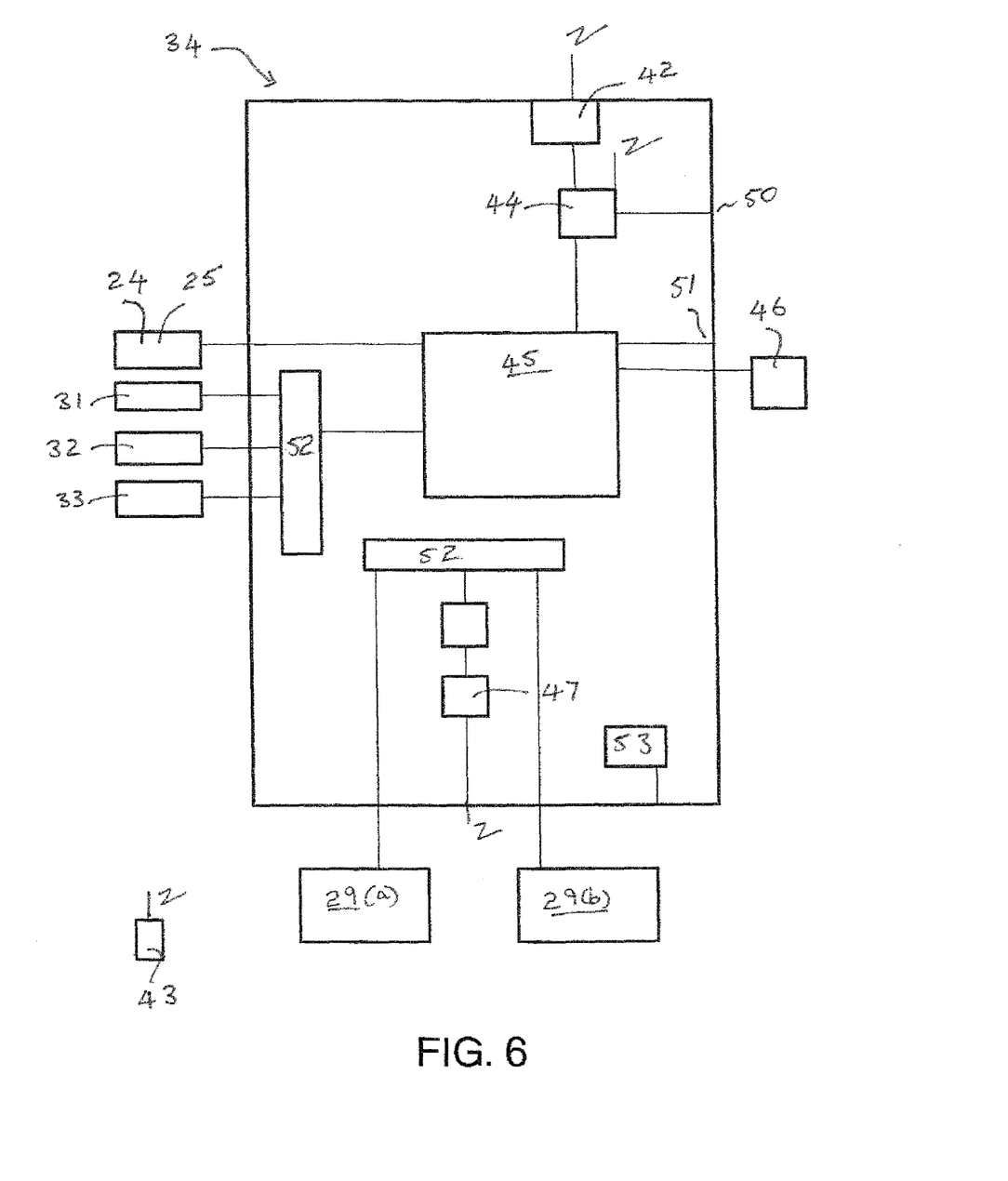
FIG. 6 is a schematic view of a preferred processing system for use with a preferred system of the present invention.

FIG. 6 shows a schematic view of a processing system that may be used with the present invention. The processing system includes a stand alone controller unit 34 that that receives data from the sensor array 29a and 29b, transducers, 31, 32, 33, electronic identification devices 24, 25 and electronic weight scale. The controller is linked to a computer 45 with touch screen to display measurement as well as entering cattle identification when an EID is not functional or absent. The computer is linked to network router 44 and ADSL modem 42 or wireless ENet for data transfer to site or remote computer or server. Plug connections to an ENet 50 and USB port 51 are also provided. A hand held remote trigger 43 is used to manually capture data and transmit to receiver 47. The controller has terminals 52 and a power supply 53.

The controller 34 may operate in a manual and/or automatic mode. In the manual mode, an operator, typically holding the remote trigger 43 will activate the processor to capture data from the sensors and transducers when, in the opinion of the operator, the animal is substantially still. In the automatic mode of operation, a stream of measurements are taken and when the signals are relatively constant for a predetermined period of, for example 5 to 10 seconds, measurements will be taken.

Figure 7:
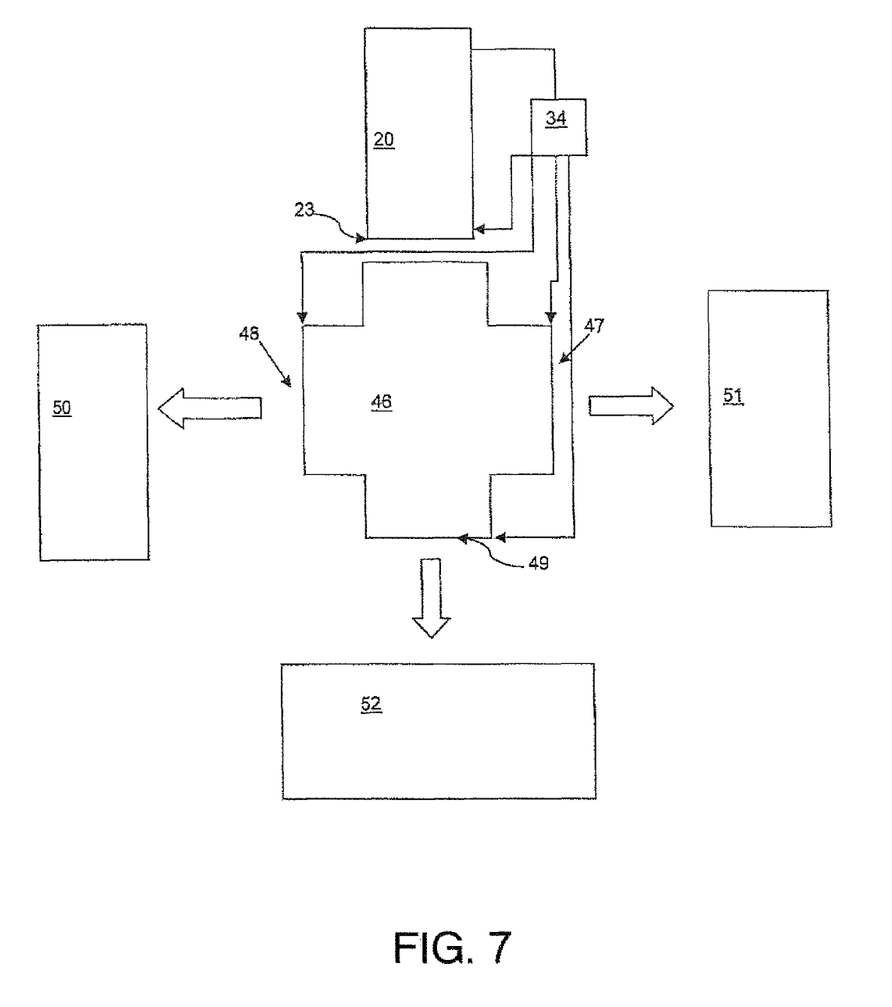
FIG. 7 is a schematic view of a preferred system of the present invention used in an automatic animal drafting system.

FIG. 7 shows a schematic view of the system 20 and method of the present invention being used to automatically draft cattle depending upon their measurements. This exit gate of the system leads into a pen 46 that has three exit gates 47, 48, 49, each exit leading into a holding pen or yard 50, 51, 52. Each gate is under the control of controller 34 such that animals may automatically be sorted into different holding yards. For example, cattle upon entering a feed lot may be sorted according to size and then resorted upon second or further measurements depending upon growth rate which in turn provides an estimate as to finishing weight, time remaining on feed, amount of feed required and the like.

Figures 8, 9:
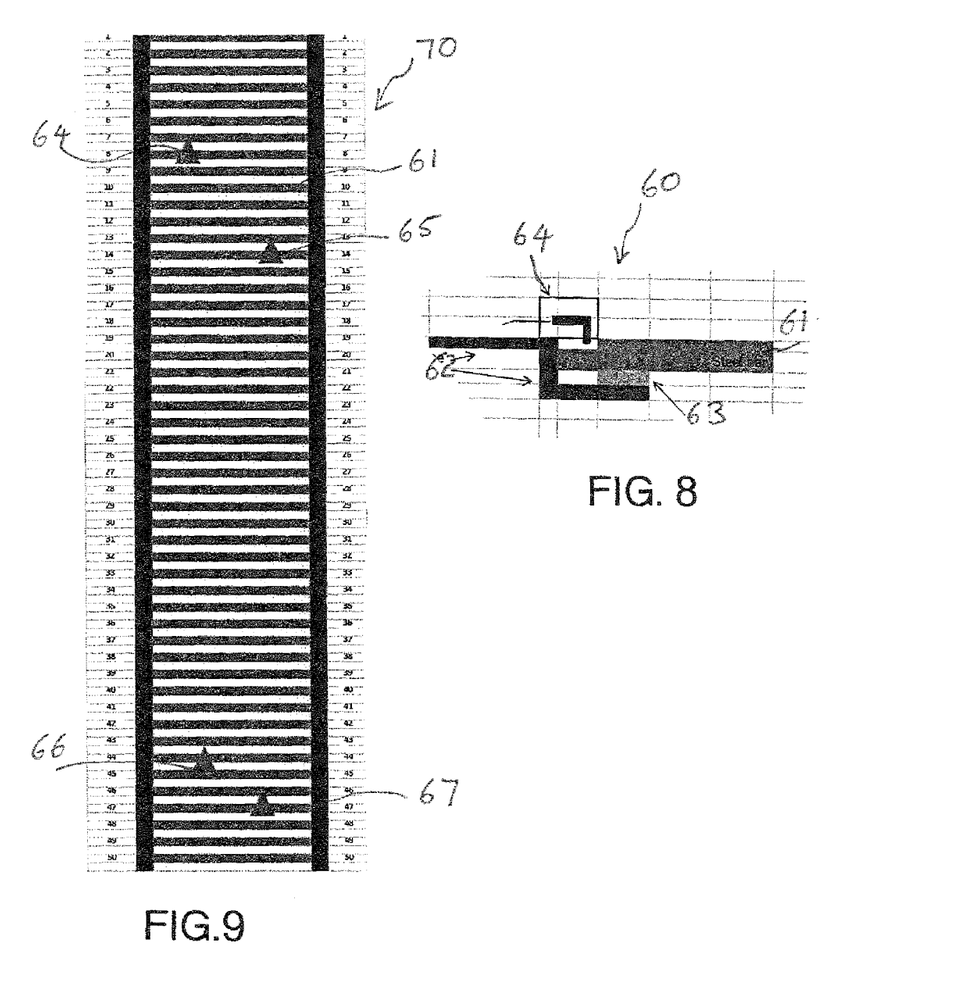
FIG. 8 is a schematic view of a section of another preferred system of the present invention having a grid and FIG. 9 is a schematic plan view of the grid of the system shown in part in FIG. 8.

FIG. 8 is a schematic view of a sensor arrangement 60 associated with a steel bar 61 that forms part of a floor grate. The bar 61 is mounted within a metal frame 62 and is moveable between an at rest position (as shown) and a depressed position. The bar 61 is biased towards the rest position by compression material 63. A position or proximity sensor 64 is located adjacent the edge of the steel bar for detecting when the bar is in the rest or sensing position. The sensor may be any suitable type of sensor. One example of a suitable sensor is an inductive sensor. An advantage of an inductive sensor is that it does not require physical contact and thus can operate in dirty conditions. Alternatively, if the sensor is a contact sensor, i.e. relies upon contact with the steel bar in the rest position, which contact is broken when the bar is depressed to the sensor position, the sensor may be housed within a dust resistant housing.

FIG. 9 shows a schematic view of a floor grate 70 having a number of bars 61 as shown in FIG. 8. The bars are numbered from 1 to 50, number 1 being at the front of the grip anterior region of the animal and bar number 50 at the posterior region of the animal. The bars are spaced 40 mm apart. The positions of an animals' front 64, 65 and rear 66, 67 feet are shown. The respective feet have depressed bar numbers 8, 14, 44 and 47, which are at distances of 320 mm, 560 mm 1760 mm and 1880 mm from the front of the grid. The length of the animal may be calculated as front feet (((560 mm−320 mm)×0.5)+320))=440 mm and rear feet (((1880 mm−1760 mm)×0.5)+1760 mm)=1820 mm for a length of 1820 mm−440 mm=1380 mm.

It may be seen that by calculating the distances in this manner, it is not necessary to use a sensor to determine the distance. This allows simpler and more cost effective sensors to be used. It also avoids errors that may occur when using sensors to determine distances in a dirt or dusty environment.

It may be appreciated that the method and system of the present invention allows the relative locations of an ungulates legs to be measured easily without causing undue stress to the animal and without compromising handler safety. Periodic measurements enable growth rate to be determined. Growth rate may then be used to predict a number of factors including time on feed before reaching a target end weight, tissue composition and carcass quality. Such measurements may also assist animal managers in allocating feed resources to achieve a desired growth rate and live tissue composition.

It will be appreciated that various changes and modifications may be made to the present invention as described and claimed herein without departing from the spirit and scope thereof.

The invention claimed is:

1. A system for measuring relative positions of a front leg and a hind leg of a standing ungulate, the system comprising:
a grate upon which an ungulate to be measured stands and which comprises a plurality of parallel bars spaced a known distance apart, each bar being moveable from a free position to a displaced position in response to the weight of the ungulate when a front leg or the hind leg is placed thereon, each bar having a sensor operatively associated therewith, which sensor is responsive to and transmits data regarding the displacement of an associated bar by at least one of the front leg and the hind leg; and
a processor for receiving the data transmitted by each sensor, identifying those bars which have been displaced and based upon the distance between the displaced bars, determining the relative front leg and hind leg positions.

2. The system of claim 1, wherein the processor further determines a mid\- point between the front legs and a midpoint between the hind legs and calculates skeletal body length from said midpoints.

3. The system of claim 1, wherein measurement is initiated manually by an operator.

4. The system of claim 1, wherein measurement is initiated automatically by the processor.

5. The system of claim 1, which further comprises a confinement unit for confining the ungulate in a stationary position and without physical restraint, the confinement unit having a base and side walls, wherein the side walls diverge upwardly away from the base such that the head space area for a confined an ungulate is wider than the lower leg space area.

6. The system of claim 5, wherein the confinement unit has at least one bumper located on one or both of the side walls and towards the base such that in use the bumper or bumpers at least partially define the lower leg space area.

7. The system of claim 6, wherein the bumper or bumpers are moveable between a withdrawn and extended position.

8. The system of claim 1, which further comprises a device for measuring the pelvic height of the ungulate.

9. The system of claim 8, wherein the device includes an ultrasonic transducer for emitting an ultrasonic signal towards the pelvic region of the ungulate and which measures the distance between the ultrasonic transducer and the pelvic region.

10. The system of claim 1 which further includes a device for measuring a width of the ungulate.

11. The system of claim 10 wherein the measurement obtained by the device is used to sort the measured animals.

12. The system of claim 11, wherein the device for measuring the width comprises a pair of ultrasound transducers located so as to respectively emit ultrasound signals towards opposing sides of the ungulate and which measures the distance between the transducer and the ungulate.

13. The system of claim 1 which further includes a reader for electronically identifying an electronic animal identifier.

14. The system of claim 13, wherein the electronic animal identifier is selected from the group consisting of electronic ear tags, implants, collar and ruminal boluses.

15. The system of claim 1 having physical dimensions selected to accommodate a bovine.

16. The system of claim 15, wherein distance between the bars is between about 30 mm and about 80 mm.

17. The system of claim 1, wherein each sensor is an inductive sensor.

18. The system of claim 1, wherein the processor further determines a mid-point between the front legs and a midpoint between the hind legs and calculates skeletal body length of the ungulate from said midpoints.

19. A method for measuring relative front and hind leg positions of a standing ungulate, the method comprising:
providing a sensing area within which an ungulate to be measured stands and which comprises a plurality of discrete linear sensor regions spaced a known distance apart within the sensing area, each sensor region having a sensor operatively associated therewith, which sensor is responsive to the presence of a lower part of a-at least one of a front leg and a hind leg within the sensor region, wherein the sensing area is a grate comprising a plurality of parallel bars and each linear sensor region is defined by said bar and each bar is moveable between a free position and a depressed sensing position in response to the weight of an ungulate placed thereon; and
identifying one or more sensor regions within which the lower part of the at least one of a front leg or a hind leg is present and based upon the distance between the identified sensor regions, determining the relative front and hind leg positions.

20. The method of claim 19, wherein the linear sensor regions are defined by a series of bars moveable between a free position to a displaced position in response to an ungulate's weight placed thereon.

21. The method of claim 20, wherein the ungulate is a bovine.

22. The method of claim 21 further comprising determining a midpoint between the front legs and a midpoint between the hind legs and calculating skeletal body length from said midpoints.

23. A method for determining the growth rate of an ungulate, the method comprising:
determining a first skeletal body length and weight at a first time point, determining a second skeletal length and second weight at a second time point and comparing the first and second lengths and weights;
wherein the first skeletal body length and the second skeletal body length are determined by the method of claim 22.

24. The method of claim 23, wherein pelvic height is also measured at said first and second time points.

25. The method of claim 23, wherein pelvic width is also measured at said first and second time points.

* * * * *